US005206207A

United States Patent [19]
Tolles

[11] Patent Number: 5,206,207
[45] Date of Patent: Apr. 27, 1993

[54] PREPARATION FOR HIGH ACTIVITY HIGH DENSITY CARBON

[75] Inventor: Edward D. Tolles, Charleston, S.C.

[73] Assignee: Westvaco Corporation, New York, N.Y.

[21] Appl. No.: 853,133

[22] Filed: Mar. 18, 1992

[51] Int. Cl.$^5$ .................... C01B 31/12; B01J 20/20
[52] U.S. Cl. ........................ 502/424; 55/74; 502/433; 502/425; 502/426; 502/427
[58] Field of Search ............... 502/425, 424, 423, 426, 502/427, 437

[56] References Cited
U.S. PATENT DOCUMENTS

| | | | |
|---|---|---|---|
| 2,083,303 | 6/1937 | Krczil | 502/24 |
| 2,508,474 | 5/1950 | Slyh et al. | 502/424 |
| 2,580,647 | 1/1952 | Bielawski | 502/425 |
| 3,639,266 | 2/1972 | Battista | 502/437 |
| 4,155,878 | 5/1979 | Tolles et al. | 252/423 |
| 4,869,739 | 9/1989 | Kahome et al. | 55/269 |
| 5,039,651 | 8/1991 | Kosaka et al. | 502/425 |
| 5,118,329 | 6/1992 | Kosaka et al. | 55/59 |

Primary Examiner—Paul E. Konopka
Attorney, Agent, or Firm—Terry B. McDaniel; Daniel B. Reece, IV; Richard L. Schmalz

[57] ABSTRACT

Carbonaceous material is activated to produce a high activity, high density gas-phase activated carbon under conditions which effectively alter the particle pore size distribution to optimize the carbon's mesoporosity. The carbon is particularly suited for application in emission control for vehicles.

14 Claims, No Drawings

PREPARATION FOR HIGH ACTIVITY HIGH DENSITY CARBON

BACKGROUND OF THE INVENTION

1. Field of the Invention

The present invention relates to activated carbon and methods for preparing same. Particularly, this invention relates to new carbons useful in vapor adsorption and methods for their production. More particularly, this invention relates to activated carbon derived from lignocellulosic material prepared by chemical activation and shaping to produce carbon of high density and high activity.

2. Description of the Prior Art

Activated carbon is a microcrystalline, nongraphitic form of carbon which has been processed to increase internal porosity. Activated carbons are characterized by a large specific surface area typically in the range of 500–2500 m$^2$/g, which permits its industrial use in the purification of liquids and gases by the adsorption of gases and vapors from gases and of dissolved or dispersed substances from liquids. Commercial grades of activated carbon are designated as either gas-phase or liquid-phase adsorbents. Liquid-phase carbons generally may be powdered, granular, or shaped; gas-phase, vapor-adsorbent carbons are hard granules or hard, relatively dust-free shaped pellets.

Generally, the larger the surface area of the activated carbon, the greater its adsorption capacity. The available surface area of activated carbon is dependent on its pore volume. Since the surface area per unit volume decreases as individual pore size increases, large surface area is maximized by maximizing the number of pores of very small dimensions and/or minimizing the number of pores of very large dimensions. Pore sizes are defined by the International Union of Pure and Applied Chemistry as micropores (pore width<1.3 nm), mesopores (pore width=1.8–50 nm), and macropores (pore width>50 nm). Micropores and mesopores contribute to the adsorptive capacity of the activated carbon; whereas, the macropores reduce the density and can be detrimental to the adsorbant effectiveness of the activated carbon, on a carbon volume basis. The adsorption capacity and rate of adsorption depend to a large extent upon the internal surface area and pore size distribution. Conventional chemically activated lignocellulose-based carbons generally exhibit macroporosity (macropore volume) of greater than 20% of the carbon particle total volume. Gas-phase activated carbon macroporosity of less than 20% of the carbon particle volume would be desirable. Likewise, a high percentage of mesoporosity (i.e., above 50% of total particle volume) is desirable.

Commercial activated carbon has been made from material of plant origin, such as hardwood and softwood, corncobs, kelp, coffee beans, rice hulls, fruit pits, nutshells, and wastes such as bagasse and lignin. Activated carbon also has been made from peat, lignite, soft and hard coals, tars and pitches, asphalt, petroleum residues, and carbon black.

Activation of the raw material is accomplished by one of two distinct processes: (1) chemical activation, or (2) thermal activation. The effective porosity of activated carbon produced by thermal activation is the result of gasification of the carbon at relatively high temperatures (after an initial carbonization of the raw material), but the porosity of chemically activated products generally is created by chemical dehydration/condensation reactions occurring at significantly lower temperatures.

Chemical activation typically is carried out commercially in a single kiln. The carbonaceous material precursor is impregnated with a chemical activation agent, and the blend is heated to a temperature of 450°–700° C. Chemical activation agents reduce the formation of tar and other by-products, thereby increasing yield.

A "hard active carbon of high adsorptive power in the shaped or moulded state" is taught in U.S. Pat. No. 2,083,303 to be prepared by impregnating pulverized organic raw material, such as "sawdust, peat, lignite or the like" with "known activating agents, such as zinc chloride or phosphoric acid" and heated to 100°–200° C. for one to one and a half hours producing a partially carbonized state wherein the material is somewhat plastic. Without reducing the temperature, the material is molded under pressure to a desired shape. The shaped material then is activated in a rotary activating retort and brought to a temperature of 450°–600° C. for about four hours.

Similarly, U.S. Pat. No. 2,508,474 teaches a gas mask activated carbon to be prepared by impregnating low density cellulosic material, such as finely divided wood in the form of wood shavings or sawdust, with concentrated zinc chloride, and heating to 120°–145° C. while agitating for not less than fifty minutes. The reacted mass then is compacted into "forms of appreciable size;" said forms are dried at 160°–300° C.; the dried forms are crushed into granular particles; the granules are calcined at 675°–725° C.; and, after leaching out of the particles a greater portion of residual zinc chloride, recalcining the activated carbon product at 1000°–1100° C. for at least thirty minutes.

These representative techniques have produced activated carbon of adequate activity and density for many gas-phase applications, especially for purification and separation of gases as in industrial gas streams, in odor removal in air conditioning systems, and in gas masks. However, older technology gas-phase activated carbons have not proven entirely satisfactory in some applications for recovery (not just removal) of organic vapors which involves adsorption onto the carbon surface followed by desorption from the carbon for recapture. In fact, due to environmental concerns and regulatory mandates, one of the largest single applications for gas-phase carbon is in gasoline vapor emission control canisters on automobiles. Evaporative emissions vented from both fuel tank and carburetor are captured by activated carbon.

Fuel vapors, vented when the fuel tank or carburetor is heated, are captured in canisters generally containing from 0.5 to 2 liters of activated carbon. Regeneration of the carbon is accomplished by using intake manifold vacuum to draw air through the canister. The air carries desorbed vapor into the engine where it is burned during normal operation. An evaporative emission control carbon should have suitable hardness, a high vapor working capacity, and a high saturation capacity. The working capacity of a carbon for gasoline vapor is determined by the adsorption-desorption temperature differential, by the volume of purge air which flows through the carbon canister, and by the extent to which irreversibly adsorbed, high molecular weight gasoline components accumulate on the carbon.

Because of various economic considerations and space limitations in placing the carbon canister onboard a vehicle, this particular application of granular or shaped activated carbon requires higher activity and higher density properties than typically produced by the older technology noted. One method to control product density is taught by published European Patent Application 0 423 967 A2. The applicants note "a number of problems inherent in the use of wood as a raw material to produce directly a chemically activated pelletised form," claiming it to be "impossible to produce a high density activated carbon from a wood flour material" for lack of sufficient natural binding agent. An improved product (of substantially increased density) is claimed by use of, as a starting material, a "young carbonaceous vegetable product" having a "high concentration of natural binding agent." Such materials include nut shell, fruit stone and kernel, and in particular olive stone, almond shell, and coconut shell.

Also, U.S. Pat. No. 5,039,651 teaches densification of activated carbon product from cellulose materials including coconut shells, wood chips, and sawdust by pressing after initially heating to a relatively low temperature, followed by extrusion and calcination. Yet, with this improved processing the patentees could produce only carbons that were measured to have a volumetric working capacity (in terms of butane working capacity, or BWC) of up to 12.3 g/100 cm$^3$, although BWC values up to 15 g/100 cm$^3$ are claimed.

These prior art gas-phase carbons may have been satisfactory for limited volumes of vapors emitted from the carburetor and fuel tank. Because of impending environmental regulations requiring capture of greater amounts of fuel vapor emissions, it is anticipated that the volume of these additional vapors, combined with the space limitations and economic considerations which limit expansion of the size of canister systems, will require activated carbons with higher densities, higher activities, and higher volumetric working capacities than disclosed by the prior art (e.g., BWC>15 g/100 cm$^3$).

Therefore, it is an object of this invention to provide activated carbons of high activity and relatively high density suitable for solvent and vapor capture and recovery. It is a further object of this invention to provide chemical activation processes for producing higher activity gas-phase activated carbons without sacrificing density. Also, it is an object of this invention to employ the high density, high activity chemically activated carbon for vehicle emission control.

SUMMARY OF THE INVENTION

The above objects of the invention are achieved, unexpectedly, by the activation of a carbonaceous material, preferably a carbohydrate-rich material such as cellulose, sugars, and starches, more preferably lignocellulosic material, with a chemical activation agent in a manner to produce a plastic intermediate product which is densified to effectively minimize the macropore structure of the activated carbonaceous material. Densification is followed by increasing the temperature of the shaped product at a controlled rate to from about 425° C. to about 650° C.

Alternative novel processes of the invention may be employed depending on the starting material employed and level of activation desired. Certain processes may be controlled to regulate the degree of macroporosity preservation to produce either carbons more suitable for liquid phase applications or carbons more suitable for gas-phase applications. The novel high activity, high density gas-phase activated carbons produced are characterized by butane working capacities greater than 15 g/100cm$^3$, a butane activity of from about 50 to about 80 g/100 g, preferably from about 60 to about 80 g/100 g, and more preferably from about 70 to about 80 g/100 g, and a density of from about 0.25 to about 0.40 g/cm$^3$, preferably from about 0.27 to about 0.40 g/cm$^3$, more preferably from about 0.30 to about 0.40 g/cm$^3$.

Preferably, such an activated carbon material also would exhibit a mesopore content of greater than about 50%, preferably greater than about 60%, and more preferably greater than about 70%, based on the total particle volume, and a macropore content of less than 20%, preferably less than 18%, and more preferably less than 15%, based on the total particle volume.

DESCRIPTION OF THE PREFERRED EMBODIMENTS

The raw material precursor in the invention activation process may be any of the carbonaceous material of plant or mineral origin earlier recited. Preferred precursors primarily are lignocellulosic materials of plant origin and include wood-based materials such as wood chips, wood flour, and sawdust, as well as nut pits and nut shells such as coconut shell. As such, this carbonaceous material precursor is combined with the activating agent in some fragmented form, from "chip" sized wood to a more "particulate" form as wood flour or wood dust. Chemical activation agents may include: alkali metal hydroxides, carbonates, sulfides, and sulfates; alkaline earth carbonates, chlorides, sulfates, and phosphates; phosphoric acid; polyphosphoric acid; pyrophosphoric acid; zinc chloride; sulfuric acid; and oleum. Preferred among these are phosphoric acid and zinc chloride. Most preferred is phosphoric acid.

The invention methods for producing the novel carbon can be described generally by the following sequence of steps:
1. Activating agent/carbonaceous material blending
2. Stage 1 heat treatment (plasticization)
3. Shaping and densifying
4. Stage 2 heat treatment (thermosetting)
5. Activation The activation typically occurs in a rotary kiln in which the temperature of the thermoset shaped mixture is raised to about 550° C. This basic process normally is followed with washing and drying steps.

One particular method for producing the invention activated carbon product involves blending a 3:1-1:1 mixture, preferably 2:1-1.2:1, respectively, of a chemical activating agent, preferably phosphoric acid or zinc chloride, with a fragmented lignocellulose material, preferably wood chips, sawdust (or, wood dust), or wood flour, with agitation for up to one hour at a temperature of from about 35° C. to about 95° C., after which the mixture is spread on a flat surface in layers of a thickness of from about 6 mm to about 25 mm. The mixture is subjected to a first stage heat treatment at a temperature of from about 35° C. to about 95° C. for a time sufficient that the mixture material begins to thermoset. Then the material is subjected to a densification step which involves processing through a compressive shaping device such as an extruder or a spheronizer. A particular spheronizer of choice is a Marumerizer. Then the shaped material is heat treated again (second stage) at from about 35° C. to about 95° C. to complete the densification by completing the thermosetting process. Upon complete elimination of plasticity, the temperature is gradually increased to from about 425° C. to about 650° C.

Typical product characteristics resulting from this process are shown in Table I.

TABLE I

| Invention Activated Carbon Product Characteristics | |
|---|---|
| Butane Working Capacity | 17.7 g/100 cm$^3$ |
| Butane Activity | 68.0 g/100 g |
| Surface Area | 2180 m$^2$/g |
| Apparent Density | 0.30 g/cm$^3$ |
| Particle Density | 0.46 g/cm$^3$ |
| Mesopore Content | 58% |
| Macropore Content | 12% |

The surprising improvement in butane working capacity of the new carbon product reflects a major increase in mesoporosity of the individual carbon particles, at the expense of macroporosity.

A standard determination of surface area of activated carbon usually is by the Brunauer-Emmett-Teller (BET) model of physical adsorption using nitrogen as the adsorptive. This was the method employed in calculating the invention carbon surface areas, based on nitrogen adsorption isotherm data in the range of 0.05 to 0.20 relative pressure.

In the case of granular activated carbon, the density is an important feature of the effectiveness of the adsorbent, as many applications of granular or shaped activated carbon involve a static active carbon bed of fixed volumetric size. The apparent density (AD) of the invention activated carbon is measured according to the method ASTM D 2854. Measurements of apparent density of carbon in a packed bed of particles reported herein were based on 10×25 mesh carbon materials.

The density of the individual carbon particles (PD) was determined by displacement of mercury using a Micromeritics ® PoreSizer 9310 instrument. The density is based on the mass of a particle and its volume including pores smaller than 35 micrometers.

Butane activity of the invention carbons was calculated by placing a weighed sample of the dry activated carbon, approximately 15 ml in volume, in a 1.45 cm diameter tube and admitting butane gas therein. The amount adsorbed at saturation at 25° C. is weighed and reported as butane activity (BACT) in grams of butane per 100 grams carbon (g/100 g). The tube then is purged with air at 25° C. at 250 ml/min. for 40 minutes, and the amount of butane removed is reported as butane working capacity (BWC) in grams of butane per 100 ml of carbon (g/100 cm$^3$). The carbon mass to volume conversion is made on the basis of the measured value of the carbon apparent density. In view of the interrelationship of butane activity, BWC, and density, for carbons of a density from about 0.25 to about 0.40 g/cm$^3$, a BWC >15 can be achieved with butane activity values of at least about 50 g/100 g.

Porosity in pores larger than 50 nm (macroporosity) was determined using a Micromeritics ® PoreSizer 9310 which measures the volume of mercury forced into pores under the influence of pressure. The distribution of pore volume with pore size is calculated using the Washburn equation, a standard model.

Porosity in pores smaller than 50 nm was determined using a Micromeritics ® DigiSorb 2600. Adsorption isotherm data for nitrogen, measured at a temperature of about 77° K., are used with the Kelvin and Halsey equations to determine the distribution of pore volume with pore size of cylindrical pores according to the standard model of Barrett, Joyner, and Halenda. For the purposes of the examples and the invention claimed herein, macroporosity consists of pore diameters greater than 50 nm, mesoporosity consists of pore diameters of from 1.8 to 50 nm, and microporosity consists of pore diameters of less than 1.8 nm.

The invention method for producing the improved activated carbon product and its use in auto emission control are disclosed in the following examples.

EXAMPLE 1

Multiple batches of activated carbon products were prepared by repeatedly mixing 2,070 g of concentrated phosphoric acid solution (86% concentration) with 1,950 g of sawdust (43% moisture) for an acid:sawdust ratio of 1.6:1 (by dry weight of their respective solids) and stirring for 30 minutes at 80°-95° C., after which the mixture (a mass of discreet sawdust particles) was transferred to shallow glass trays and spread into 1-1.5 cm thick layers for continued heating in an oven. Heat treatment was continued at 70° C. for about 36 hours, at which time the material began transition from plastic to thermoset (i.e., product appears dry and not sticky but is nevertheless soft enough to be shaped in the Marumerizer). Upon shaping by processing in the Marumerizer (residence time of 15-30 minutes at 800 rpm), the individual sawdust particles were formed into smooth beads. In some instances, smaller particles may have agglomerated with one or more other smaller particles and have been shaped to form a smooth bead. The shaped product was returned to the oven for continued heating at 85° C. for about 36 hours to complete the thermosetting process.

Activation of the thermoset char was performed in a bench-scale, direct-fired rotary kiln by gradually raising the temperature to about 480° C.

The seven batches of carbon yielded butane working capacity values ranging from 16.1 g/100 cm$^3$ to 18.2 g/100 cm$^3$. The properties of these activated carbon products are listed in Table II.

TABLE II

| | Activated Carbon Properties | | |
|---|---|---|---|
| Sample No. | BWC g/100 cm$^3$ | Butane Activity g/100 g | Apparent Density g/cm$^3$ |
| 1 | 16.7 | 67.2 | 0.28 |
| 2 | 17.3 | 64.4 | 0.30 |
| 3 | 18.2 | 68.8 | 0.30 |
| 4 | 16.2 | 63.6 | 0.28 |
| 5 | 17.1 | 66.6 | 0.29 |
| 6 | 16.1 | 63.8 | 0.29 |
| 7 | 18.1 | 69.0 | 0.30 |

EXAMPLE 2

A 1.3 liter sample having a BWC of 17.7 g/100 cm$^3$ was prepared for gasoline vapor adsorption testing by combining product of sample nos. 3, 5, and 7 from Example 1. In this test, a 375 ml sample of activated carbon in a test canister is challenged with gasoline vapor generated by bubbling 200 ml/min of air through 300 ml of gasoline at a temperature of 30° C. The vapor is adsorbed on the carbon and at saturation breakthrough is detected with a total hydrocarbon analyzer at a concentration of about 5000 ppm. After breakthrough, a countercurrent flow of air is admitted at a rate of 7.5 ml/min for 10 minutes to desorb the gasoline vapor. The adsorption/desorption steps are continued for 25 cycles.

The gasoline working capacity (GWC) is calculated as the average mass of vapor adsorbed during cycles 21-25, expressed on a carbon volume basis. The test showed a capacity of 61 g/l, which compares to a 50 g/l for commercial WV-A 1100.

Also, pore size distribution of this sample combination was determined by using mercury intrusion and nitrogen adsorption. Analysis of this data indicates that mechanical action in the Marumerizer substantially decreased the macropore (>50 nm) volume of the product. An increase in the large mesopore (5-50 nm) volume suggests that some kind of squeezing action took place, but there was, nevertheless, a net reduction in porosity outside the small mesopore (1.8-5 nm) range (important for butane working capacity), which translates to an increase in effective density. Table III compare the invention carbon with commercial WV-A 1100 in terms of butane capacity and porosity.

TABLE III

| Carbon | BACT g/100 g | BWC g/100 ml | AD gm/ml | PD gm/ml | PERCENT OF PARTICLE VOLUME | | | |
|---|---|---|---|---|---|---|---|---|
| | | | | | >50 nm Macro | 5-50 nm Large Meso | 1.8-5 nm Small Meso | <1.8 nm Micro |
| WV-A 1100 | 47.3 | 11.8 | .28 | .48 | 23 | 9 | 38 | 6 |
| Invention | 68.0 | 17.7 | .30 | .46 | 12 | 12 | 46 | 8 |

EXAMPLE 3

An activated carbon product of Process A was prepared by blending 2235 g of phosphoric acid solution (86% concentration) with 2069 g of 4×14 mesh (U.S.) wood chips (42% moisture, produced using a rotary drum chipper) for an acid:wood ratio of 1.6:1. The mixture was stirred for 60 minutes at 50° C. after which it was transferred to shallow glass trays for heat treatment in an oven at about 120° C. for 45 minutes. Following this initial heat treatment, the mixture was transferred to an oven and heated at about 140° C. for 30 minutes. The plastic char, which retained the discrete nature of the wood chips, was processed in a Marumerizer for 30 minutes to partially shape and densify it, but without substantially changing its granular nature. Then it was transferred to an oven to complete the thermosetting process by heating it at 85° C. for 16 hours. The thermoset char was activated by raising its temperature to about 480° C., using a direct-fired, rotary kiln. The activated char was washed with water to remove the residual acid and the granular activated carbon product evaluated, yielding the following product property values:

TABLE IV

| Butane Working Capacity: | 15.8 g/100 cm³ |
|---|---|
| Apparent Density | 0.26 g/cm³ |
| Butane Activity | 68.2 g/100 cm³ |
| Particle Density | 0.43 g/cm³ |
| Surface Area | 2490 m²/g |
| Macropore Content | 19% |
| Mesopore Content | 54% |

In each of the above examples, activated carbon of surprisingly high butane working capacity is produced by increasing surface area without sacrificing material density. This has been achieved by increasing carbon particle mesoporosity. In most instances the increase in mesoporosity has been created while simultaneously reducing the carbon particle's macroporosity.

While the invention high activity, high density carbon has been described and illustrated herein by references to various specific materials, procedures, and examples, it is understood that the invention is not restricted to the particular materials, combinations of materials, and procedures selected for that purpose. With the disclosure herein of the concepts employed to produce the novel carbon, numerous variations of such details can be employed, as will be appreciated by those skilled in the art.

What is claimed is:

1. A process for activating lignocellulosic material comprising the steps of:
   (a) blending together fragments of the lignocellulosic material with an activating agent selected from the group consisting of phosphoric acid and zinc chloride to effect chemical activation of the lignocellulosic material;
   (b) subjecting the blended materials to sufficient heat to effect plasticization of the acid-treated lignocellulosic material fragments to begin transition to thermoset;
   (c) densifying the heat-treated, acid-treated lignocellulosic material by mechanically shaping the plastic fragments in a spheronizer;
   (d) subjecting the shaped, acid-treated lignocellulosic material to sufficient heat for a sufficient time to effect thermosetting of the material; and
   (e) subjecting the thermoset, shaped, acid-treated lignocellulosic material to a final activation by heating the material to from about 425° to about 650° C. to produce an activated lignocellulosic material with a butane working capacity of greater than 15 g/100 cm³.

2. The process of claim 1 wherein the lignocellulosic material is selected from the group consisting of wood chips, sawdust, and wood flour.

3. The process of claim 2 wherein the fragments are discrete particles.

4. The process of claim 1 wherein the ratio of activating agent to lignocellulosic material is from about 3:1 to about 1:1, respectively.

5. The process of claim 4 wherein the ratio is from about 2:1 to about 1.2:1, respectively.

6. The process of claim 1 wherein the blending of step (a) is conducted at from about 35° to about 95° C. for a period of up to one hour.

7. The process of claim 1 wherein the heat treatment of step (b) is conducted at from about 35° to about 95° C.

8. The process of claim 1 wherein the heat treatment of step (d) is conducted at from about 35° to about 95° C.

9. The process of claim 1 wherein the final activation of step (e) is conducted to a temperature of about 550° C.

10. An improved process for preparing an activated carbon comprising blending lignocellulosic material fragments with a chemical activating agent selected from the group consisting of phosphoric acid and zinc chloride, heating to plasticize the blended material, shaping the heated blend fragments, and subjecting the shaped material to activation temperatures wherein the improvement comprises producing an activated carbon characterized by a butane working capacity of greater than 15 g/100 cm$^3$ by densifying the carbon by shaping in a spheronizer the blended material fragments at transition point from being plastic to being thermoset and subjecting the shaped material to complete thermosetting of the material prior to subjecting it to activating temperatures.

11. The improved process of claim 10 wherein the lignocellulosic material is selected from the group consisting of wood chips, sawdust, and wood flour.

12. The improved process of claim 10 wherein the chemical activating agent is phosphoric acid.

13. The improved process of claim 10 wherein the ratio of chemical activating agent and lignocellulosic material is from about 3:1 to about 1:1, respectively.

14. The improved process of claim 13 wherein the ratio is from about 2:1 to about 1.2:1, respectively.

* * * * *

UNITED STATES PATENT AND TRADEMARK OFFICE
CERTIFICATE OF CORRECTION

PATENT NO. : 5,206,207
DATED : April 27, 1993
INVENTOR(S) : Edward D. Tolles

It is certified that error appears in the above-indentified patent and that said Letters Patent is hereby corrected as shown below:

On the title page, under References Cited, delete "Kahome et al." and substitute therefor --Kanome et al.--.

In column 1, line 38, delete "1.3" and substitute therefor --1.8--.

In column 7, lines 16 and 17, delete "compare" and substitute therefor --compares--.

Signed and Sealed this

Twenty-first Day of June, 1994

BRUCE LEHMAN

*Attest:*

*Attesting Officer*     *Commissioner of Patents and Trademarks*